(12) United States Patent
Chen

(10) Patent No.: US 9,188,730 B2
(45) Date of Patent: Nov. 17, 2015

(54) LIGHT SOURCE MODULE USING LASER AS LIGHT SOURCE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/255,974

(22) Filed: Apr. 18, 2014

(65) Prior Publication Data

US 2015/0168637 A1    Jun. 18, 2015

(30) Foreign Application Priority Data

Dec. 13, 2013   (TW) .............................. 102146292 A

(51) Int. Cl.
*F21V 7/04* (2006.01)
*F21V 8/00* (2006.01)

(52) U.S. Cl.
CPC .............. *G02B 6/0068* (2013.01); *G02B 6/003* (2013.01); *G02B 6/0026* (2013.01); *G02B 6/0031* (2013.01)

(58) Field of Classification Search
CPC .... G02B 6/0026; G02B 6/0028; G02B 6/003; G02B 6/0031; G02B 6/0068; G02F 1/29; H01S 3/101
USPC ...................... 362/553, 608, 610, 621; 349/63
See application file for complete search history.

(56) References Cited

U.S. PATENT DOCUMENTS 7,798,660 B2 *   9/2010   Itoh et al. ......................... 362/19

* cited by examiner

*Primary Examiner* — Jason Moon Han
(74) *Attorney, Agent, or Firm* — Novak Druce Connolly Bove + Quigg LLP

(57) ABSTRACT

A light source module comprises a plurality of laser light sources, a lens module, a plurality of optical components, and a light guiding plate. The lens module includes a first lens having a rear arced plane and a plurality of second lenses each having a front arced plane, and the second lenses are positioned on the first lens and protruded forwardly from the first lens toward the optical components. The optical components are positioned on light path of light emitted from the laser light sources in sequence and each correspond to one second lens, and the optical components are, except the farthest one from the laser light sources, beamsplitters, respectively and used for reflecting a part of the light emitted from the laser light sources to the second lenses and permitting another part of the light to penetrate therethrough to a next optical component.

20 Claims, 5 Drawing Sheets

LIGHT SOURCE MODULE USING LASER AS LIGHT SOURCE

BACKGROUND

1. Technical Field

The present disclosure generally relates to a light source module, and particularly to an edge-type backlight module which uses lasers as a light source.

2. Description of Related Art

In recent years, due to excellent light quality and high luminous efficiency, light emitting diodes (LEDs) have increasingly been used as substitutes for incandescent bulbs, compact fluorescent lamps and fluorescent tubes as light sources of illumination devices.

Generally, white LEDs (light emitting diodes) have replaced CCFLs (cold-cathode fluorescent lamps) as a light source for a light source module such as a backlight module. The continuous, whole spectrum white light generated by the LEDs or the CCFLs cannot be effectively used by the LCD (liquid crystal display) which is lightened by the light source module whereby energy is wasted and the color saturation of the image from the LCD is not satisfied.

What is needed, therefore, is a light source module which can overcome the disadvantages as described above.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
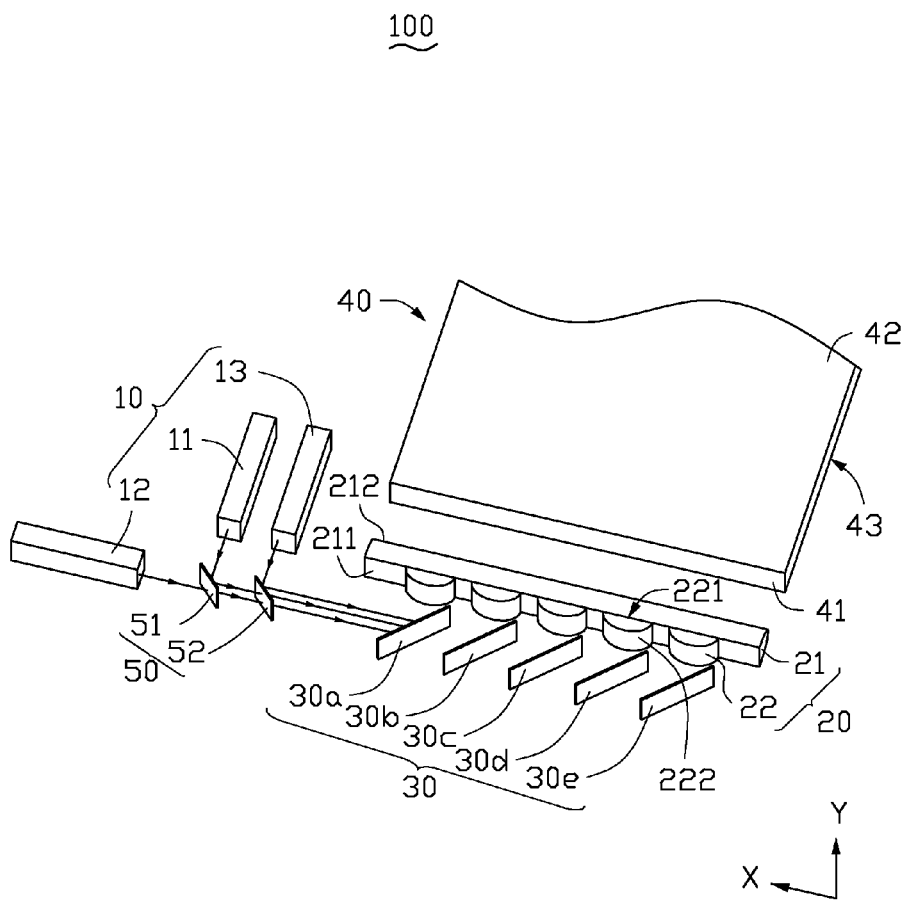
FIG. 1 is an isometric, assembled view of a light source module in accordance with an exemplary embodiment of the present disclosure.
Figure 2:
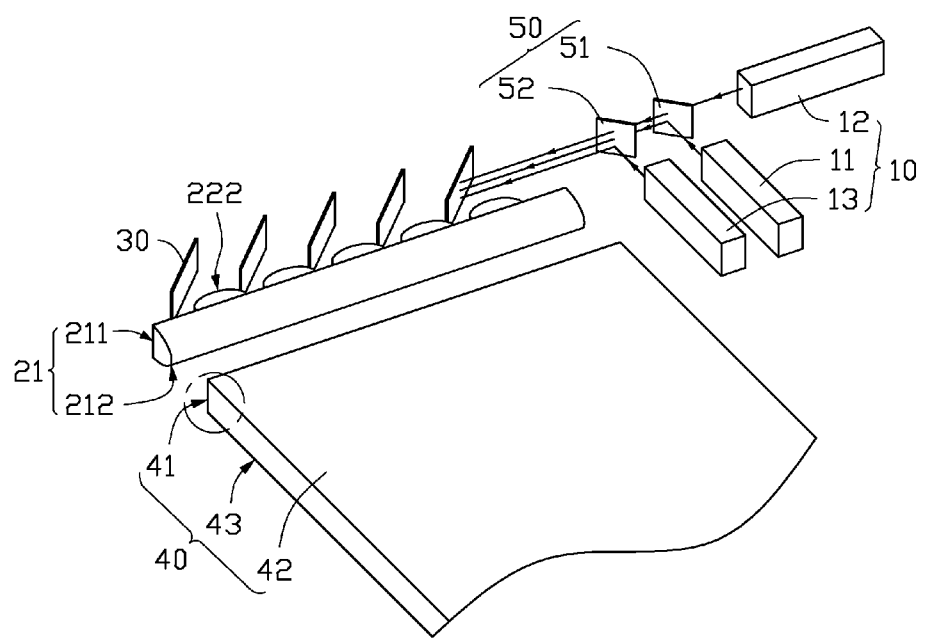
FIG. 2 is a view similar to FIG. 1, but viewed from a different direction thereof.
Figure 3:
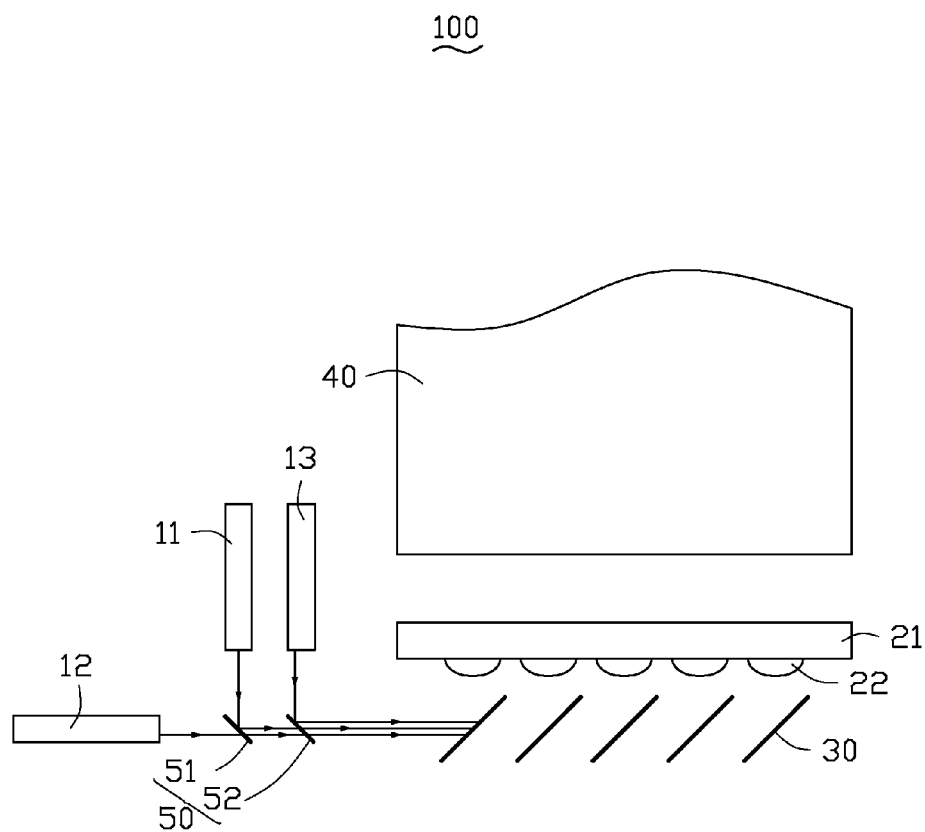
FIG. 3 is a top view of the light source module of FIG. 1.

Referring to FIGS. 1 to 3, a light source module 100 in accordance with a first embodiment of the present disclosure is shown. The light source module 100 includes a plurality of laser light sources 10, a lens module 20, a plurality of optical components 30, and a light guiding plate 40. The light source module 100 is a backlight module, particularly an edge-type backlight module, for illumining an LCD (liquid crystal display, not shown).

The laser light sources 10 emit laser light. In this embodiment, there are three laser light sources 10 including a red laser source 11, a green laser source 12 and a blue laser source 13. The three laser light sources 10 are collimated light sources generating light each having its respective spectrum, whereby white light obtained by a mixture of the light generated by the three laser light sources 10 can have three distinctive spectra which can be effectively used by the LCD to enable the image of the LCD to have a high color saturation.

The lens module 20 includes a first lens 21 and a plurality of second lenses 22 fixed on the first lens 21. The first lens 21 includes a front flat plane 211 and a rear arced plane 212 extending rearwards from the front flat plane 211 toward the light guiding plate 40. The rear arced plane 212 is curved along a top to bottom (height) direction of the lens module 20. The first lens 21 is elongated and extends along a first direction X of an XY plane which is annotated in FIG. 1. The second lenses 22 are positioned on the front flat plane 211 of the first lens 21. The second lenses 22 each include a rear flat plane 221 contacting the first lens 21 and a front arced plane 222 extending forwardly from the rear flat plane 221 toward the optical components 30. The front arced plane 222 is curved along a left to right (width) direction of the lens module 20. An optical axis (not shown) of the front arced plane 222 extends through a center thereof along a second direction Y annotated in FIG. 1. The first direction X is perpendicular to the second direction Y. In this embodiment, the light source module 100 includes five second lenses 22. The five second lenses 22 are protruded from the front flat plane 211 of the first lens 21 and evenly spaced from each other. Top and bottom of each second lens 22 are flat.

The optical components 30 are positioned on a light path of the light emitted from the laser light sources 10 and uniformly spaced from each other in sequence. Each optical component 30 is placed corresponding to one second lens 22. In this embodiment, the optical components 30 of the light source module 100 includes five optical components respectively labeled as 30a, 30b, 30c, 30d, and 30e, in a direction away from the laser light sources 10. The five optical components 30a, 30b, 30c, 30d, and 30e are optical lens having different degrees of light reflectivity. Each optical component 30a, 30b, 30c, 30d, or 30e is inclined to the front flat plane 211 of the first lens 21 of the lens module 20. An angle between each optical component 30a, 30b, 30c, 30d, or 30e and the front flat plane 211 is, preferably, 45 degrees. The optical components 30a, 30b, 30c, 30d, except the farthest one 30e from the laser light sources 10, each are a beamsplitter. The ratios of reflectance/transmittance of the optical components 30a, 30b, 30c, 30d are different from each other. The optical components 30a, 30b, 30c, 30d each reflect a part of light impinging thereon and allow the other part of the light to be transmitted therethrough. The farthest optical component 30e from the laser light sources 10 is totally reflective. In this embodiment, a reflectance/transmittance ratio of the optical component 30a, 30b, 30c, 30d, or 30e closer to the laser light sources 10 is smaller than that of a neighbor optical component 30a, 30b, 30c, 30d, or 30e away from the laser light sources 10. In other words, the reflectance/transmittance ratio of the optical component 30a, 30b, 30c, 30d, and 30e becomes larger in the direction away from the laser light sources 10. Specifically, the reflectance/transmittance ratio of the five optical components 30a, 30b, 30c, 30d, and 30e are $1/5$, $1/4$, $1/3$, $1/2$ and 1, in the direction away from the laser light sources 10. The farthest optical component 30e away from the laser light sources 10 is a totally reflective lens. The light emitted from the laser sources 10 are distributed by the five optical components 30a, 30b, 30c, 30d, and 30e to evenly enter the lens module 20. A part of the light striking on the closest optical component 30a is reflected to enter the corresponding second lens 22, and the other part of the light penetrates the optical component 30a to strike the next optical component 30b. So do the optical components 30b, 30c, and 30d before the farthest optical component 30e. When the light strikes on the farthest optical component 30e, the light is totally reflected thereby to enter the front arced plane 222 of the corresponding second lens 22. Thus, all the light emitting from the laser sources 10 can be evenly incident into the lens module 20.

Figure 4:
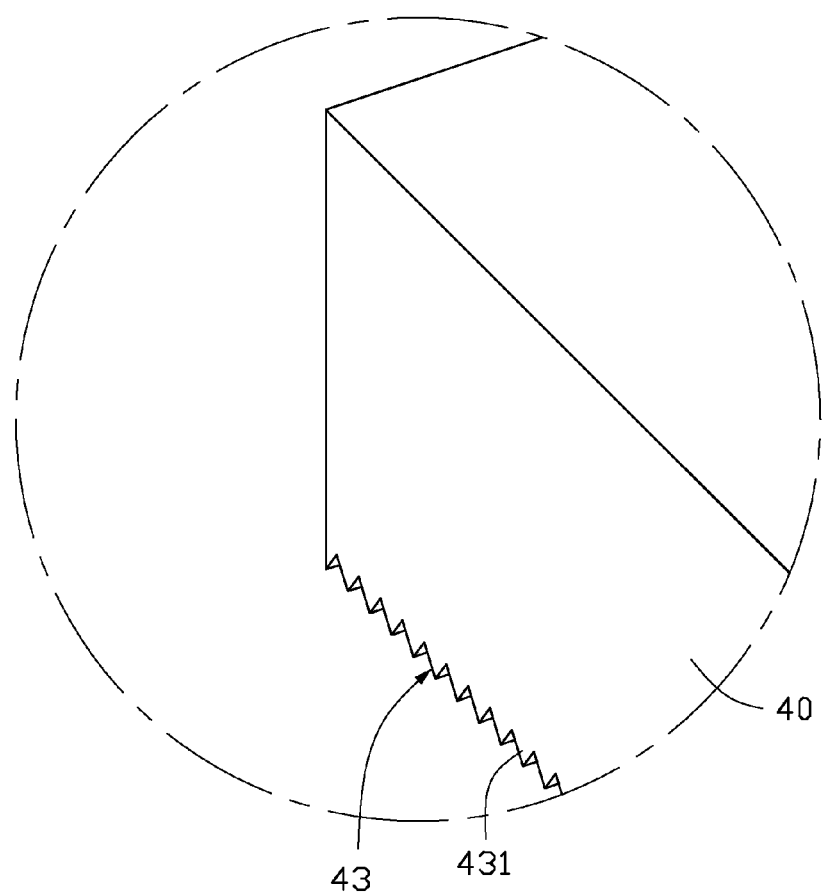
FIG. 4 is an enlarged view of a part IV of the light source module of FIG. 2, showing in detail a bottom of a light guiding plate of the light source module in accordance with a first embodiment of the present disclosure.
Figure 5:
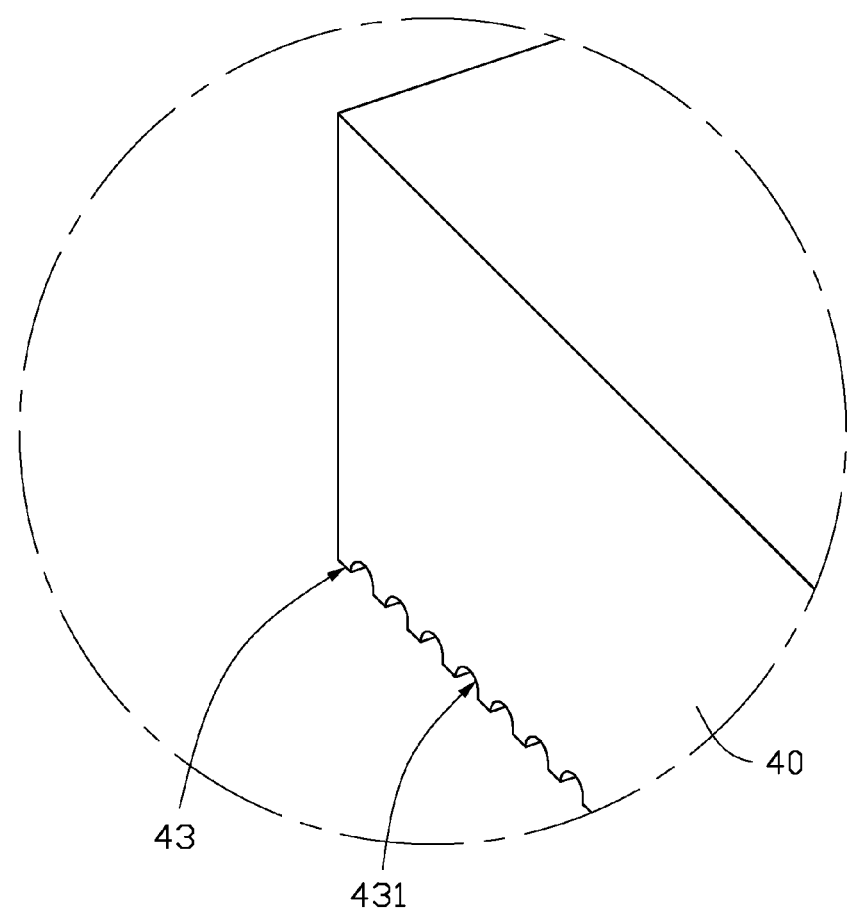
FIG. 5 is a view similar to FIG. 4, showing in detail the bottom of the light guiding plate of the light source module in accordance with a second embodiment of the present disclosure.

Referring to FIG. 2 and FIG. 4, the light guiding plate 40 includes an incidence surface 41 facing the rear arced plane 212, an outputting surface 42 connecting with and perpendicular to the incidence surface 41, and a bottom surface 43 opposite the outputting surface 42 and connecting with and perpendicular to the incidence surface 41. The bottom surface 43 is a totally reflective surface with a plurality of protrusions 431 formed thereon. The light traveling in the guiding plate 40 is reflected by the bottom surface 43 to the outputting surface 42 and extracted to an outside from the outputting surface 42 to illuminate the LCD. In the first embodiment, the protrusions 431 each are formed between two serrated recesses in the bottom surface 43. In the second embodiment, as shown in FIG. 5, the protrusions 431 each are formed between two arced recesses in the bottom surface 43.

The light emitted from the laser light sources 10 strikes on the front arced planes 222 of the second lenses 22 after being reflected by the optical components 30 to move along the direction Y. The light beams reflected by the optical components 30 are evenly distributed along the first direction X whereby the light beam has the same intensity after being refracted by each of the front arced planes 222. Then the light is incident into the first lens 21 and is refracted by the rear arced plane 212 of the first lens 21 to be further evenly distributed along the height direction of the first lens 21. Accordingly, the light is then uniformly incident into the guiding plate 40 via the incidence surface 41 and travels out of the guiding plate 40 from the outputting surface 42 after being distributed by the protrusions 431 of the bottom surface 43 of the guiding plate 40. Benefiting from sufficient reflection and distribution, the light can be uniformly extracted out of the light guiding plate 40.

The light source module 100 further includes two filters 50. The filters 50 are positioned on the light path of the laser light sources 10. In this embodiment, the red laser source 11 and the blue laser source 13 are parallel to each other, and the green laser source 12 is perpendicular to the red laser source 11 and the blue laser source 13. The red laser source 11 is positioned between the blue laser source 13 and the green laser source 12. The light emitted from the red laser source 11 is parallel to the light emitted from the blue laser source 13 and perpendicular to the light emitted from the green laser source 12. One of the two filters 50 is a red light filter 51, and the other filter 50 is a blue light filter 52. Red light strikes on the red light filter 51 can be totally reflected. Other color light strikes on the red light filter 51 can totally penetrate therethrough. Blue light strikes on the blue light filter 52 can be totally reflected. Other color light strikes on the blue light filter 52 can totally penetrate therethrough. The red light filter 51 is positioned at an intersection of the light emitted from the red laser source 11 and the light emitted from the green laser source 12. The blue light filter 52 is positioned at an intersection of the light emitted from the green laser source 13 and the light emitted from the green laser source 12. The red light filter 51 is parallel to the blue light filter 52. The red light filter 51 and the blue light filter 52 both are inclined to the light emitted from the green laser source 12. An angle between the red light filter 51 and the light emitting from the green laser source 12 is preferably 45 degrees. The light emitted from the green laser source 12 is able to penetrate through the red filter 51 and the blue filter 52, and then strikes on the optical components 30. The light emitted from the red laser source 11 is reflected by the red filter 51 and then moves through the blue filter 52 in a manner parallel to the light emitted from the green laser source 12 to strike on the optical components 30. The light emitted from the blue laser source 13 is reflected by the blue filter 52 and then strikes on the optical components 30. The light emitted from the green laser source 12 travels through the red filer 51 and the blue filter 52 to strike on the optical components 30. The light emitted from the three laser sources 10 strikes on the optical components 30 is parallel to each other.

It is to be understood, however, that even though numerous characteristics and advantages of the exemplary embodiments have been set forth in the foregoing description, together with details of the structures and functions of the embodiments, the disclosure is illustrative only; and that changes may be made in detail, especially in matters of shape, size, and arrangement of parts within the principles of the embodiments to the full extent indicated by the broad general meaning of the terms in which the appended claims are expressed.

What is claimed is:

1. A light source module configured for illuminating a planar display comprising:
   a plurality of laser light sources;
   a lens module comprising a first lens and a plurality of second lenses, the second lenses positioned on the first lens and protruded from the first lens;
   a plurality of optical components positioned on light path of light emitted from the laser light sources in sequence and each corresponding to one second lens, the optical components, except a farthest one from the laser light sources, being beamsplitters respectively, and used for reflecting a part of the light emitted from the laser light sources to the second lenses and permitting another part of the light to penetrate therethrough to a next optical component away from the laser light sources; and
   a light guiding plate comprising an incidence surface facing the lens module, an outputting surface connecting to and perpendicular to the incidence surface, and a bottom surface opposite the outputting surface and connecting with the incidence surface.

2. The light source module of claim 1, wherein the laser light sources are collimated light sources.

3. The light source module of claim 1, wherein reflectance/transmittance ratios of the optical components are increased along a direction away from the laser light sources.

4. The light source module of claim 1, wherein there are five optical components, the reflectance/transmittance ratios of the five optical components are $1/5$, $1/4$, $1/3$, $1/2$ and 1 along the direction away from the laser light sources, and the farthest optical component away from the laser light sources is a totally reflective lens.

5. The light source module of claim 1, wherein the first lens comprises a first flat plane and a first arced plane neighboring to the first plane, and the second lenses are positioned on the first flat plane of the first lens, each second lens protruding to and facing a corresponding optical component.

6. The light source module of claim 5, wherein the first arced plane is curved along a height direction of the first lens.

7. The light source module of claim 1, wherein the bottom surface is a total reflective surface with a plurality of protrusions formed thereon.

8. The light source module of claim 7, wherein the protrusions each are formed between two serrated recesses in the bottom surface of the light guiding plate.

9. The light source module of claim 7, wherein the protrusions each are formed between two arc-shaped recesses in the bottom surface of the light guiding plate.

10. The light source module of claim 1, wherein the laser light sources comprise a red laser source, a green laser source and a blue laser source.

11. The light source module of claim 10, wherein the red laser source is oriented parallel to the blue laser source and perpendicular to the green laser source, and the red laser source is positioned between the green laser source and the blue laser source.

12. The light source module of claim 11 further comprising two filters, wherein one of the two filters is a red light filter and the other filter is a blue light filter.

13. The light source module of claim 12, wherein the red light filter is positioned at an intersection of the light emitted from the red laser source and the light from the green laser source, and the blue light filter is positioned at an intersection of the light emitted from the green laser source and the light emitted from the green laser source.

14. An edge-type backlight module comprising:
a plurality of laser light sources;
a lens module comprising a first lens and a plurality of second lenses protruded from the first lens;
a plurality of optical components positioned parallel to and spaced from each other and inclined to the lens module, and the optical components being, except a farthest one from the laser light sources, used for reflecting a part of the light emitted from the laser light sources to the second lenses and permitting another part of the light to penetrate therethrough to a next optical component away from the laser light sources, and the farthest optical component being used for totally reflecting the light penetrating through and from the other optical components in front thereof; and
a light guiding plate comprising an incidence surface facing the first and second lenses, an outputting surface connecting to and perpendicular to the incidence surface, and a bottom surface opposite the outputting surface and connecting with the incidence surface.

15. The edge-type backlight module of claim 14, wherein a reflectance/transmittance ratio of the optical component closer to the laser light sources is smaller than that of a neighbor optical component away from the laser light sources.

16. The edge-type backlight module of claim 15, wherein there are five optical components, the reflectance/transmittance ratios of the five optical components are $1/5$, $1/4$, $1/3$, $1/2$ and 1 in the direction away from the laser light sources, and the farthest optical component away from the laser light sources is a totally reflective lens.

17. The edge-type backlight module of claim 14, wherein the first lens comprises a first flat plane and a first arced plane protruding from the first flat plane to the light guiding plate, and the second lenses are positioned on the first flat plane of the first lens, each second lens facing a corresponding optical component, the first arced plane being curved along a height direction of the first lens, each second lens comprising a second arced plane protruding toward the corresponding optical component, the second arced plane being curved along a width direction of the first lens.

18. The edge-type backlight module of claim 17, wherein the first lens extends in a first direction, and the second lenses are protruded from the first lens in a second direction which is perpendicular to the first direction.

19. The edge-type backlight module of claim 14, wherein the bottom surface of the light guiding plate is a totally reflective surface with a plurality of protrusions thereon and the protrusions each are formed between two serrated recesses in the bottom surface.

20. The edge-type backlight module of claim 14, wherein the bottom surface is a totally reflective surface with a plurality of protrusions thereon and the protrusions each are formed between two arc-shaped recesses in the bottom surface.

* * * * *